United States Patent [19]

Takahashi

[11] Patent Number: 4,728,077
[45] Date of Patent: Mar. 1, 1988

[54] DRAINAGE VALVE UNIT

[75] Inventor: Katsuaki Takahashi, Sohka, Japan

[73] Assignee: Shoketsu Kinzoku Kogyo Kabushiki Kaisha, Tokyo, Japan

[21] Appl. No.: 842,221

[22] Filed: Mar. 21, 1986

[51] Int. Cl.⁴ .................................... F16K 31/524
[52] U.S. Cl. ............................ 251/257; 251/263; 251/321; 251/900
[58] Field of Search ............... 251/257, 263, 321, 900

[56] References Cited

U.S. PATENT DOCUMENTS

| | | | |
|---|---|---|---|
| 1,163,471 | 12/1915 | Schramm | 251/257 X |
| 1,593,122 | 7/1926 | Hallstead | 251/257 X |
| 1,973,327 | 9/1934 | Blair | 251/263 X |
| 2,286,880 | 6/1942 | Traut | 251/257 X |
| 2,417,494 | 3/1947 | Hoof | 251/900 X |

Primary Examiner—Arnold Rosenthal

Attorney, Agent, or Firm—Burns, Doane, Swecker & Mathis

[57] ABSTRACT

A drainage valve unit for use with a casing for collecting a drain includes a valve body adapted to be mounted on the casing and having a fluid passage and a chamber defined therein and communicating with each other, a valve member disposed in the fluid passage and movable axially of the fluid passage for opening and closing the fluid passage, and a pusher body disposed in the chamber and movable axially of the chamber, the pusher body being displaceable from outside of the valve body for causing the valve body to open the fluid passage to discharge the drain from the casing through the fluid passage. The valve member can reliably be moved to open the fluid passage for discharging the drain by pushing the pusher body irrespective of the pressure within the casing. When the fluid passage is opened, the drain can quickly be discharged without falling on the operator's hand and fingers.

5 Claims, 7 Drawing Figures

DRAINAGE VALVE UNIT

BACKGROUND OF THE INVENTION

The present invention relates to a drainage valve unit, and more particularly to a drainage valve unit including a valve body defining a drain passage therein and a valve member for opening and closing the drain passage, the valve member being actuatable toward its open position in a single operation from outside of the drainage valve unit for thereby discharging a drain.

As is well known in the art, fluid-pressure devices, such as air filters, have a drainage mechanism, i.e., a drainage valve unit, disposed on the bottom wall of the device for discharging out a liquid separated from air within the device.

FIGS. 1 and 2 of the accompanying drawings illustrate conventional drainage valves by way of example.

The drainage valve shown in FIG. 1 has a platelike valve member 3a for opening and closing a drainage valve port 2a defined in the bottom wall of a device 1 such as a filter. An annular seal 4a is positioned underneath the valve member 3a, from which there extends an operating rod 5a having a predetermined length projecting outwardly. The outwardly projecting end portion of the operating rod 5a is surrounded by a tubular resilient member 6a.

Under normal condition, the valve nmmber 3a is displaced downwardly by a high-pressure fluid introduced into the device 1 for automatically closing the valve port 2a. When a drain is collected in the device 1, the outwardly projecting end portion of the operating rod 5a is laterally pushed through the resilient member 6a in the direction of the arrow (FIG. 1). The valve member 3a is then tilted a certain angle to define a gap between the valve member 3a and the seal 4a, allowing the collected drain to be discharged out through the valve port 2a.

The drainage valve shown in FIG. 2 includes a platelike valve member 3b for opening and closing a valve port 2b defined in the bottom wall of a device 1. An annular seal 4b is disposed underneath the valve 3b, to which a downwardly extending operating rod 4b is fixed. The operating rod 4b is normally urged downwardly as shown in the direction to close the valve member 3b by a coil spring 7 disposed around the operating rod 4b.

Under normal condition, the valve port 2b is closed by the valve member 3b urged downwardly under the resilient force of the coil spring 7. When a drain is collected in the device 1, the outwardly projecting end portion of the operating rod 5b is pushed in the direction of the arrow (FIG. 2) against the resiliency of the coil spring 7. As a consequence, the valve member 3b is moved upwardly to open the valve port 2b, drawing out the drain The drainage valve shown in FIG. 1 is disadvantageous in that since the valve member 3a is sealed under the pressure within the device 1, the sealed condition will be made unstable to cause a fluid leakage if the device 1 is used under a low fluid pressure or no fluid pressure. The problem with the drainage valve shown in FIG. 2 is that because the valve member 3b is opened by pushing the operating rod 5b vertically, i.e., in the direction along the valve port 2b, the drain discharged from the valve port 2b falls on the operator's hand when the valve is opened.

SUMMARY OF THE INVENTION

It is a principal object of the present invention to provide a drainage valve unit which has a simple valve member mounted on the bottom of a casing for collecting a drain, can reliably opened and closed in a simple operation, is arranged to prevent the discharged drain from falling on the operator's hand and fingers, and can be manufactured inexpensively.

Another object of the present invention is to provide a drainage valve unit for use with a casing for collecting a drain includes a valve body adapated to be mounted on the casing and having a fluid passage and a chamber defined therein and communicating with each other, a valve member disposed in the fluid passage and movable axially of the fluid passage for opening and closing the fluid passage, and a pusher body disposed in the chamber and movable axially of the chamber, the pusher body being displaceable from outside of the valve body for causing the valve body to open the fluid passage to discharge the drain from the casing through the fluid passage.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
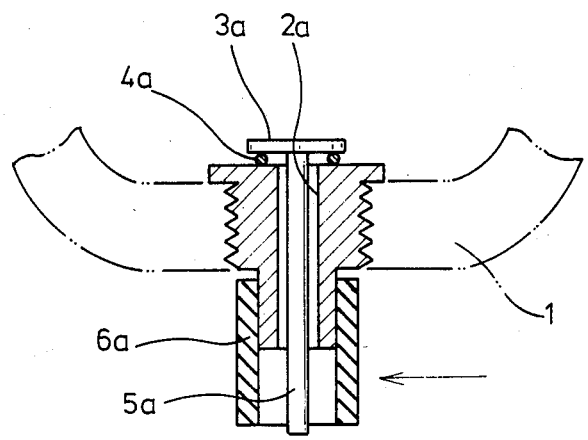
FIGS. 1 and 2 are vertical cross-sectional views of conventional drainage valves.
Figure 2:
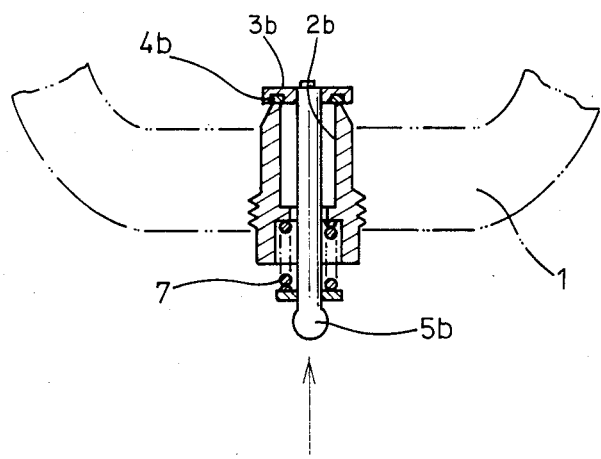
Figure 3:
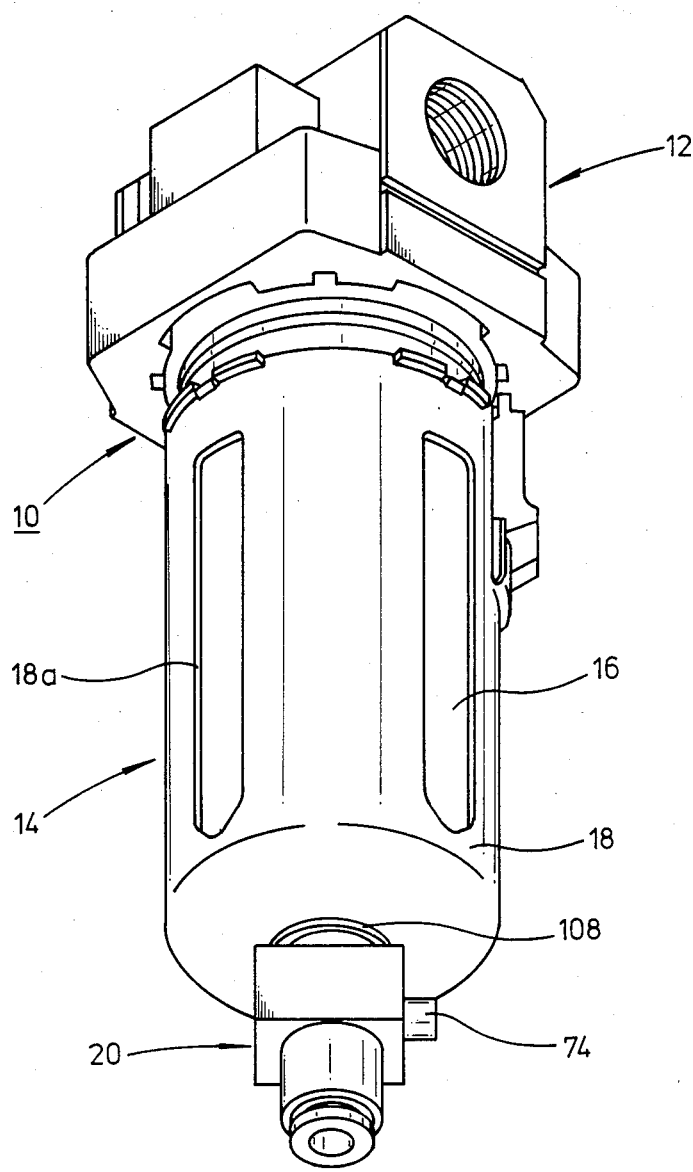
FIG. 3 is a perspective view of a filter in which a drainage valve unit of the present invention is incorporated.

FIG. 3 shows a pneumatic device 10 constructed as an air filter comprising a body 12 and a case 14. The body 12 has an inlet port for introducing air under pressure and an outlet port for supplying filtered air under pressure to another pneumatically operated device. The body 12 is fitted with a protective case guard (described later) of the case 14 through an airtight seal The case 14 comprises a casing 16 made of glass or transparent synthetic resin and a drawn case guard 18 surrounding the casing 16. The case guard 18 has slots 18a defined in its side wall for enabling the operator to visually check a drain collected in the casing 16. A drainage valve unit according to the present invention is mounted on the bottom of the casing 16 for discharging out the drain collected in the casing 16.

The drainage valve unit will be described below.

Figure 4:
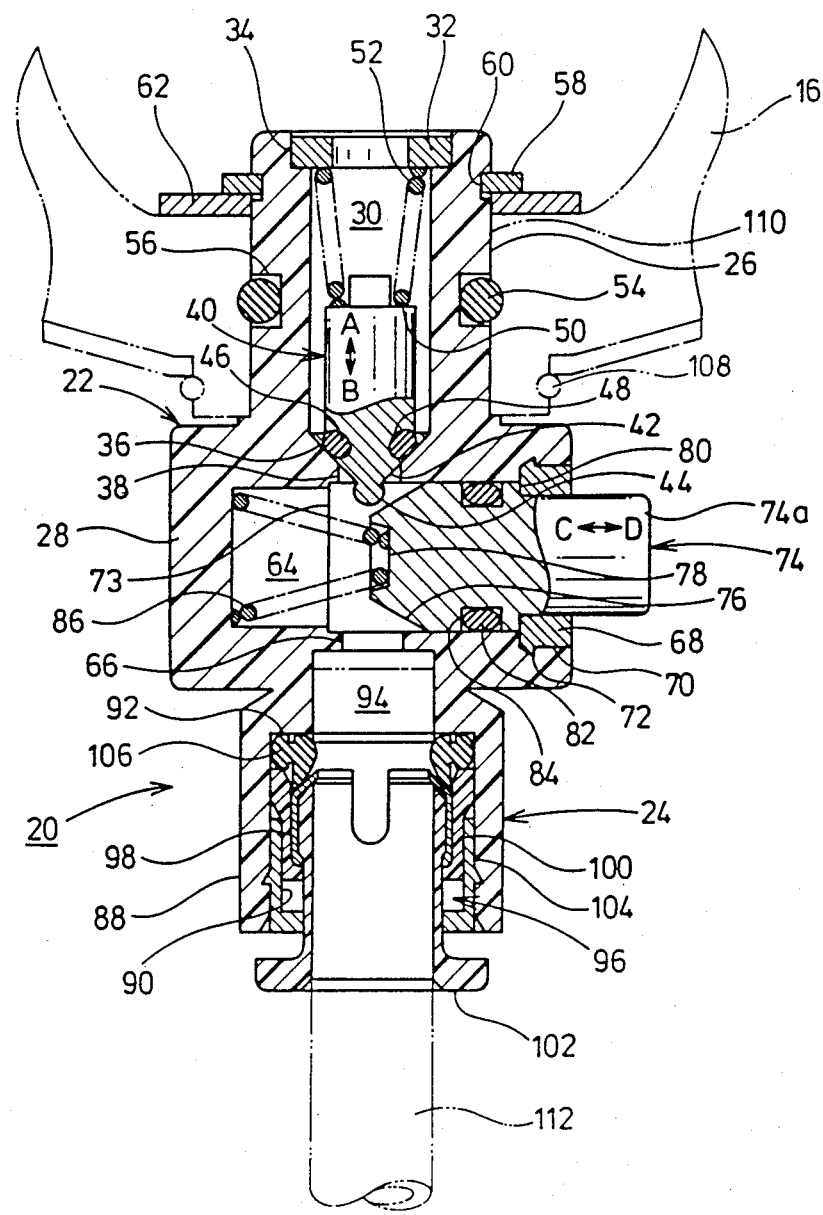
FIG. 4 is a vertical cross-sectional view of an embodiment of the drainage valve unit of the present invention.
Figure 5:
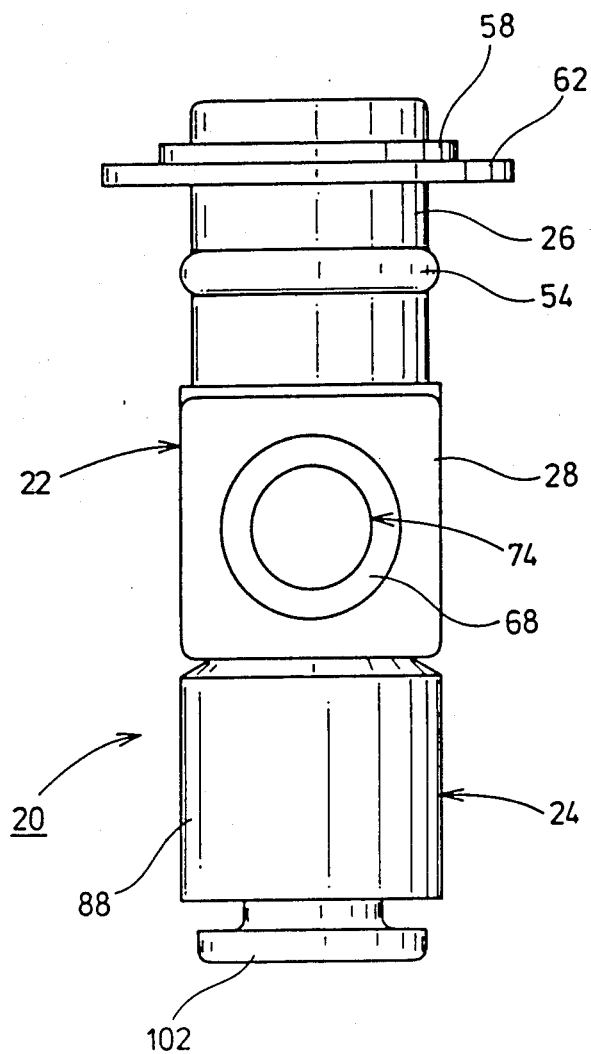
FIG. 5 is a front elevational view of the drainage valve unit shown in FIG. 4.
Figure 6:
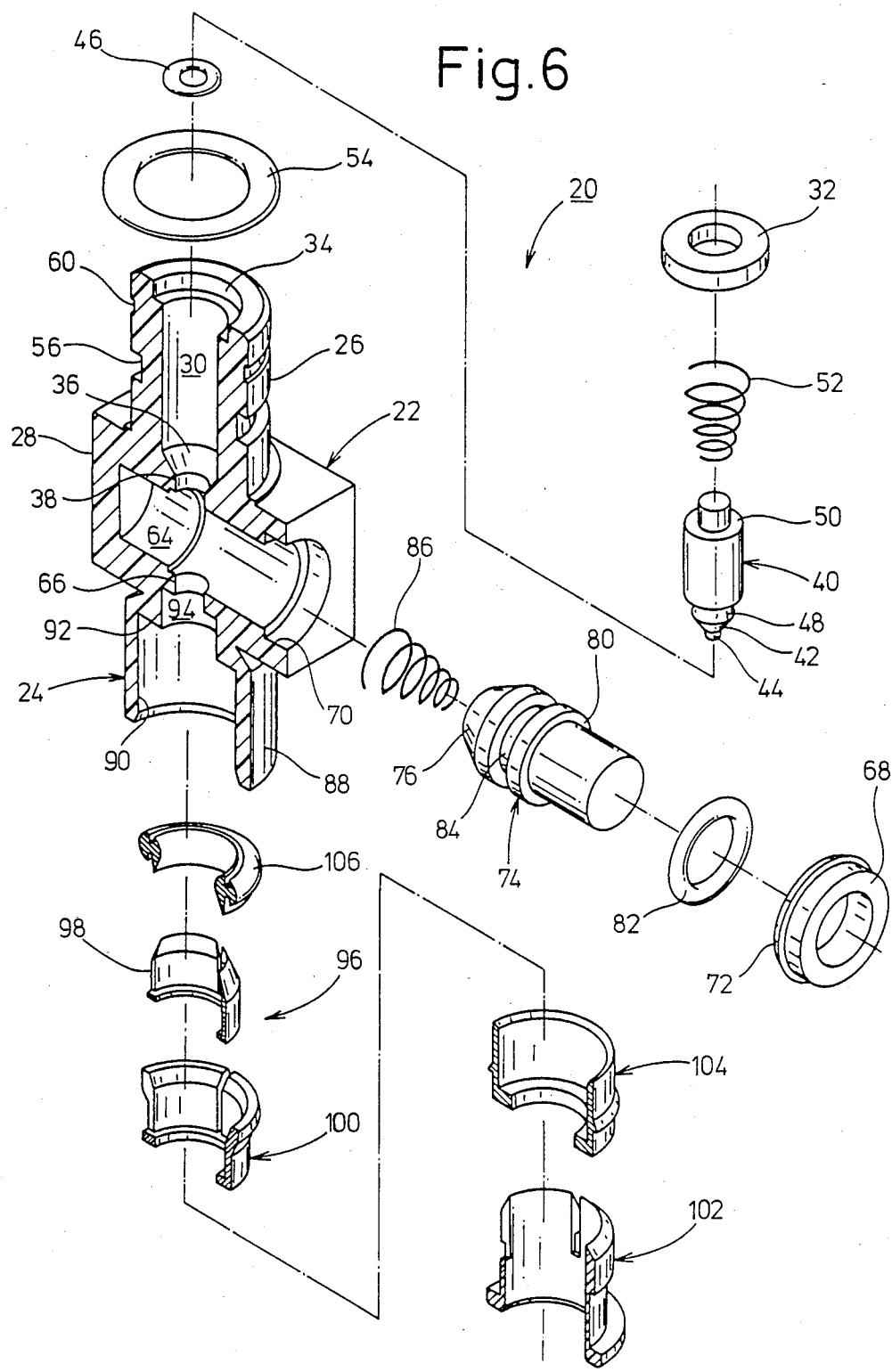
FIG. 6 is an exploded perspective view of the drainage valve unit of FIG. 4.

As shown in FIGS. 4 through 6, the drainage valve unit, generally indicated at 20, comprises a valve body 22 and a tubular coupling 24 joined thereto. The valve body 22 and the tubular coupling 24 are integrally molded, as by injection molding, of a synthetic resin material.

The valve body 22 is constructed of a first tubular body 26 having a predetermined length and a second tubular body 28 extending perpendicularly to the axis of the first tubular body 26 and having the appearance of a rectangular parallelepiped. The first tubular body 26 has a fluid passage 30 defined therein and extending vertically as shown. A collar 32 is securely fitted in a largerdiameter portion 34 at the upper end of the passage 30. The passage 30 has on its lower end a valve port 38 defined by an inclined conical surface 36 which is progressively tapered toward the open lower end of the passage 30. A substantially cylindrical valve member 40 is disposed in the passage 30 and movable in the directions of the arrows A and B (FIG. 4) to open and close the valve port 38. The valve member 40 has an inclined conical surface 42 on its lower end, the surface 42 being slanted at substantially the same angle as that at which the inclined surface 36 is slanted. The valve member 40 also has a substantially hemispherical projection 44 contiguous to the inclined surface 42. A seal ring 46 is fitted in an annular groove 48 defined in the inclined surface 42. The valve member 40 includes an annular step 50 defined on its end opposite to the inclined surface 36. A coil spring 52 is interposed between the annular step 50 and the collar 32. The valve member 40 is normally urged by the coil spring 52 to move in the direction of the arrow B to press the inclined surface 42 against the inclined surface 36 through the seal ring 46 for thereby closing the valve port 38. It is preferable that the length of the projection 44 of the valve member 40 be selected so that after the projection 44 has been positioned in the valve port 38, it projects a given distance downwardly as shown in FIG. 4. A seal ring 54 is fitted in an annular groove 56 defined in an intermediate outer circumferential surface of the first tubular body 26. An annular groove 60 is also defined in an outer circumferential surface of the first tubular body 26 at an upper end thereof and receives a C-shaped retaining ring 58. A washer 62 is interposed between the retaining ring 58 and the bottom of the casing 16.

The second tubular body 28 has a chamber 64 of a circular cross section extending horizontally as shown and having one end which is widely open. The chamber 64 communicates with the valve port 38 at its upper side and also with a communication hole 66 at its lower side. The communication hole 66 and the valve port 38 should preferably be coaxial with each other for draining purpose, as described later on. The open end of the chamber 64 has a larger-diameter portion 70 in which there is securely fitted a collar 68 having an annular ridge 72 on its outer circumferential surface, the annular ridge 72 having a sharp edge for engaging the largerdiameter portion 70 with an increased strength. The chamber 64 also has a smallerdiameter portion between its closed end and a step 73 which serves as a stopper for a spool or pusher body 74. The spool 74 is disposed in the chamber 64 for sliding movement in the directions of the arrows C and D. The spool 74 has an inclined conical surface 76 progressively tapered toward one end thereof and a recess 78 defined in the surface of the end. The opposite end portion 74a of the spool 74 is of a smaller diameter and has a prescribed length beyond a step 80. The outside diameter of the end portion 74a is slightly smaller than the inside diameter of the collar 68. An annular groove 84 is defined in an outer circumferential surface of the spool 74 axially between the inclined surface 76 and the step 80, there being a seal ring 82 fitted in the annular groove 84. A coil spring 86 is interposed between the bottom of the recess 78 of the spool 74 and the wall surface of the closed end of the chamber 64, the coil spring 86 having a diameter progressively smaller toward the spool 74. The spool 74 is normally urged by the coil spring 86 to move in the direction of the arrow D for keeping the end portion 74a projecting outwardly through the collar 68 over a certain length or distance. The spool 74 is urged in the direction of the arrow D until the step 80 abuts against the collar 68, whereupon the spool 74 is spaced a distance from the projection 44 of the valve member 40.

The tubular coupling 24 comprises a tubular body 88 having a larger-diameter hole 90 extending in the vertical direction and a smaller-diameter hole 94 connected to the larger-diameter hole 90 via a step 92 and communicating with the communication hole 66. In the larger-diameter hole 90, there is fitted a fitting assembly 96 comprising a chuck 98, a collet 100 fitted over the chuck 98, a release bushing 102 for releasing the chuck 98 from its inserted position, and a guide 104 for holding the release bushing 102 and the collet 100. Another quick connect-disconnect tubular coupling may be employed in place of the fitting assembly 96 in the hole 90. A seal 106 is disposed in the larger-diameter hole 90 against the step 92.

A ring member 108 is fitted over a projection from the bottom of the casing 16 for preventing the case guard 18 from dropping off the casing 16.

Operation and advantages of the drainage valve unit according to the present invention are as follows:

The first tubular body 26 of the drainage valve unit 20 is first inserted into a drainage hole 110 defined in the bottom of the casing 16. Then, the washer 62 is fitted over the distal end of the first tubular body 26 and retained in position by the retaining ring 58 fitted in the annular groove 60. The valve unit 20 can therefore be easily mounted on the casing 16. With the valve unit 20 mounted in position, the drainage hole 110 is securely sealed by the seal ring 54 against liquid and air leakage.

During use of the air filter, a drain is collected in the casing 16. For discharging the collected drain, a tube 112 made of a flexible material such as synthetic resin is inserted in the smaller-diameter hole 94 of the tubular coupling 24. At this time, the tube 112 can be coupled quickly and easily to the tubular coupling 24 by the fitting assembly 96. After the tube 112 for discharging the drain has been joined, the end portion 74a of the spool 74 is pushed against the resiliency of the coil spring 86 to move the spool 74 in the direction of the arrow C, thereby moving the valve member 40 in the opening direction. More specifically, the movement of the spool 74 in the direction of the arrow C causes the inclined surface 76 to engage and push the projection 44 of the valve member 40, which is then lifted in the direction of the arrow A to open the valve port 38. As a result, the drain collected in the casing 16 is allowed to flow downwardly through the valve port 38, the chamber 64, the communication hole 66, and the tube 112 into an external receiver.

Figure 7:
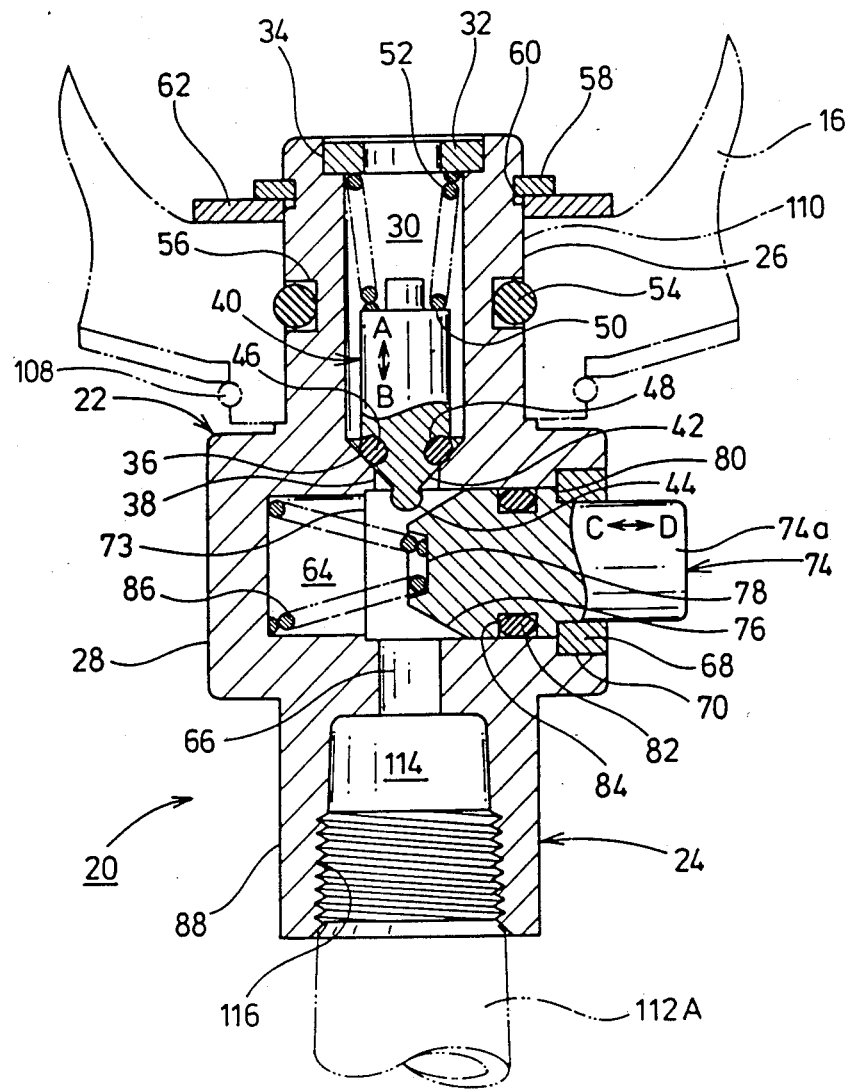
FIG. 7 is a vertical cross-sectional view of another embodiment of the drainage valve unit.

When it is confirmed that the drain is no longer discharged from the tube 112, the spool 74 is released from the push. The spool 74 springs back in the direction of the arrow D out of engagement with the valve member 40 under the resilient force of the coil spring 86. The valve member 40 is forced by the coil spring 52 to move in the direction of the arrow B to press the inclined surface 42 against the inclined surface 36 of the passage 30 through the seal ring 46, whereupon the valve port 38 is closed to keep the air filter 10 closed off against drainage FIG. 7 shows a drainage valve unit according to another embodiment of the present invention. Those reference characters in FIG. 7 which are identical to those in FIG. 4 denote identical components, and will not be described in detail The drainage valve unit of FIG. 7 differs from the drainage valve unit of the preceding embodiment in that a hole 114 is defined in the tubular body 88 in communication with the communication hole 66, and tapered screw threads 116 are formed on the inner wall surface of the hole 114. A steel pipe 112A, rather than the flexible tube, is connected to the tubular coupling 24.

With the arrangement of the present invention, a valve body has a fluid passage defined therein, and a valve member is disposed in one end of the fluid passage and movable axially of the fluid passage for opening and closing the fluid passage. The valve body also has a chamber defined therein and extending perpendicularly to the fluid passage, there being a pusher body or spool disposed in the chamber and movable axially of the chamber for moving the valve member in opening and closing directions. The valve member can reliably be moved in the opening and closing directions through simple operation of the pusher body irrespective of the pressure within a fluid-pressure device such as an air filter in which the drainage valve unit is incorporated. When the drainage valve unit is opened, the drain from the air filter can be discharged without falling on the operator's hand and fingers. Therefore, the drainage valve unit can be handled easily and operated reliably.

Although certain preferred embodiments have been shown and described, it should be understood that many changes and modifications may be made therein without departing from the scope of the appended claims.

What is claimed is:

1. A valve unit for use with a casing for collecting a drain, comprising:
    a valve body adapted to be mounted on the casing and having a fluid passage and a chamber defined therein perpendicular to the passage, said chamber and said passage communicating with each other;
    a valve member disposed in said fluid passage and movably axially of said fluid passage for opening and closing the fluid passage; and
    a pusher body disposed in said chamber and movably axially of said chamber, said pusher body being displaceable from outside of said valve body for causing said valve body to open said fluid passage to discharge the drain from the casing through the fluid passage;
    said valve member having a projection on an end thereof, said pusher body having an inclined surface on an end thereof, said projection being engagable and displaceable by said inclined surface to move said valve member to open said fluid passage in response to the displacement of said pusher body; and
    a resilient member disposed in said chamber in engagement with said pusher body for normally urging said pusher body to hold the pusher body spaced from said projection of said valve member, said resilient member comprises a coil spring having a diameter progressively smaller toward said pusher body, said coil spring having an end seated in a recess defined in the end of said pusher body.

2. A valve unit as claimed in claim 1, further comprising:
    said valve member having said inclined surface as a conical surface, a seal member being provided in the inclined conical surface for seating on a slanted surface defined between said fluid passage and said chamber for opening and closing the fluid passage.

3. A drainage valve unit according to claim 2, including a tubular coupling detachaly mounted on said valve body and a flexible tube coupled by said tubular coupling to said valve body for discharging the drain therethrough.

4. A drainage valve unit according to claim 2, wherein said valve body has a threaded hole defined therein in communication with said chamber, including a pipe engaging in said threaded hole for discharging the drain therethrough.

5. The drainage valve unit according to claim 2, wherein said valve member includes a substantially hemispherical projection at an end portion with a slanted surface provided on said pusher body for engaging the projection, and the valve member being displaced along said slanted surface by pushing said pusher body thereby opening said fluid passage.

* * * * *